United States Patent

Schleinitz et al.

(10) Patent No.: US 6,572,087 B2
(45) Date of Patent: Jun. 3, 2003

(54) THRUST SPRING

(75) Inventors: Uwe Schleinitz, Bad Soden-Salmünster (DE); Eyk Karus, Bad Soden-Salmünster (DE); Stefan Nix, Wächtersbach (DE)

(73) Assignee: WOCO AVS GmbH, Bad Soden-Salmunster (DE)

( * ) Notice: Subject to any disclaimer, the term of this patent is extended or adjusted under 35 U.S.C. 154(b) by 136 days.

(21) Appl. No.: 09/959,244
(22) PCT Filed: Feb. 23, 2001
(86) PCT No.: PCT/EP01/02114
§ 371 (c)(1), (2), (4) Date: Jan. 22, 2002
(87) PCT Pub. No.: WO01/63137
PCT Pub. Date: Aug. 30, 2001

(65) Prior Publication Data
US 2002/0158385 A1 Oct. 31, 2002

(30) Foreign Application Priority Data
Feb. 23, 2000 (DE) .......................... 100 09 544
Jan. 29, 2001 (DE) .......................... 101 04 936

(51) Int. Cl.⁷ .................. F16M 1/00; F16M 11/00; F16M 3/00; F16M 5/00; F16M 7/00
(52) U.S. Cl. .................. 267/140.4; 267/140.12; 267/140.13; 267/141.4; 267/152
(58) Field of Search .................. 267/140.11, 140.12, 267/140.13, 140.4, 141.4, 150, 152, 140.3, 141.1, 141.2, 141.3, 141.7

(56) References Cited

U.S. PATENT DOCUMENTS

| | | | | |
|---|---|---|---|---|
| 2,896,937 A | * | 7/1959 | Miller | 188/129 |
| 3,268,199 A | * | 8/1966 | Kordyban et al. | 220/632 |
| 3,721,417 A | * | 3/1973 | Skala et al. | 267/140.11 |
| 5,467,970 A | * | 11/1995 | Ratu et al. | 267/152 |
| 5,667,202 A | * | 9/1997 | Gwinn | 267/140.2 |
| 5,988,610 A | * | 11/1999 | Hiraki et al. | 267/140.13 |
| 6,039,388 A | * | 3/2000 | Choi | 16/86 R |
| 6,349,927 B1 | * | 2/2002 | Suzuki | 267/140.13 |

* cited by examiner

Primary Examiner—Christopher P. Schwartz
Assistant Examiner—Devon Kramer
(74) Attorney, Agent, or Firm—Burns, Doane, Swecker & Mathis, LLP

(57) ABSTRACT

An elastomer spring for supporting an axially arranged coil spring, in particular in an engine mounting is constructed to reduce the radial loads on the coil spring with simultaneous damping and includes a transversely soft composition for the elastomeric spring. The elastomeric spring is provided with a centering projection which may be introduced into the coil spring and a section which may be deformed by the effect of radial forces, with a molded sheet being provided to stabilize the force carrying section of the elastomeric spring.

18 Claims, 2 Drawing Sheets

THRUST SPRING

Figure 1:
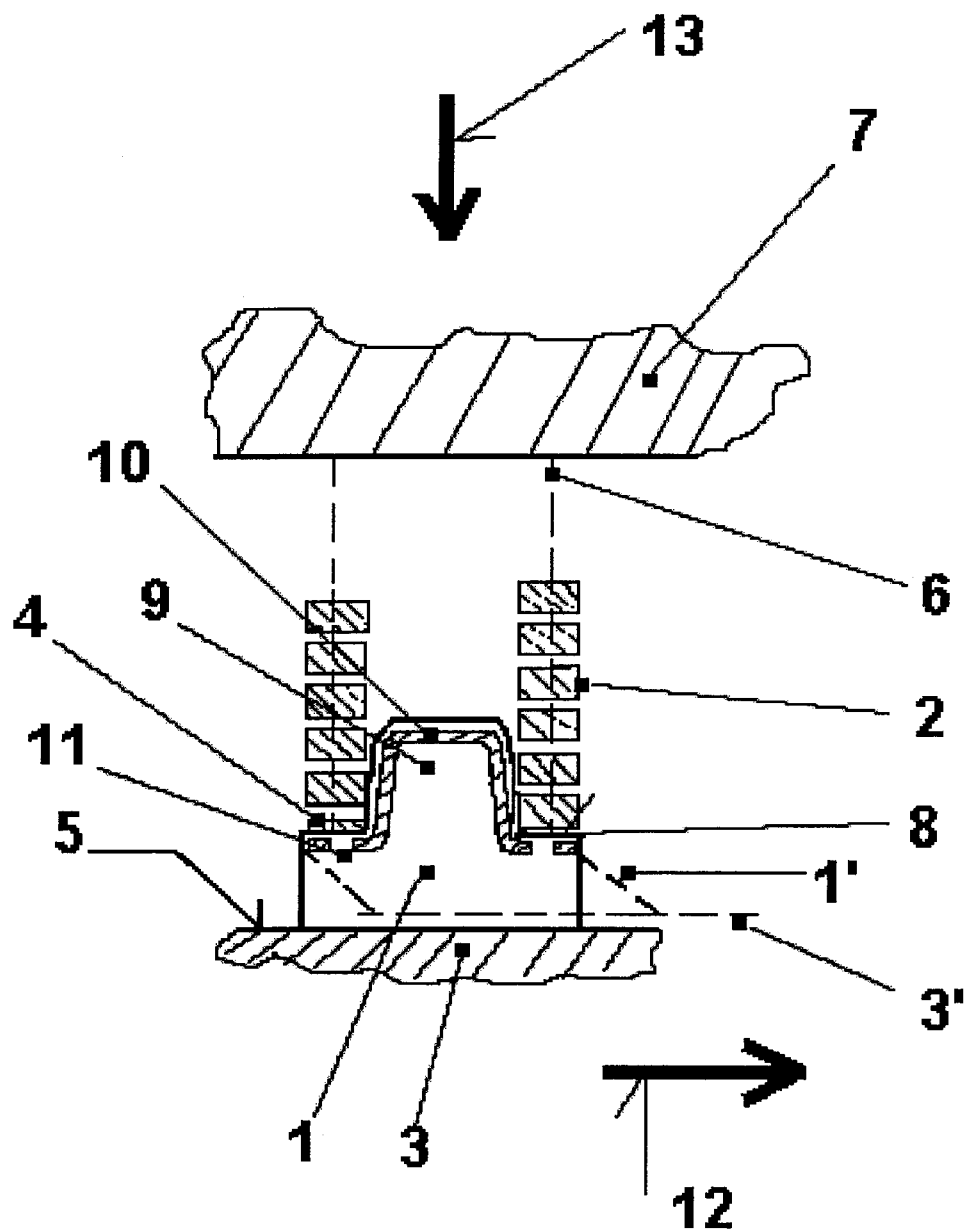

The invention relates to an elastomer spring for supporting an axially aligned helical spring in series connection, with said helical spring being axially loadable as provided under static and dynamic pressure.

The invention particularly relates to an elastomer spring for supporting that type of helical springs consisting of spring steel.

Helical springs made of spring steel exhibit excellent properties, in particular when being used for absorbing dynamic pressure loads. They allow for long linear spring excursions even when acted upon with dynamic load and also demonstrate a surprisingly good stability under such loads, are hard-wearing and inexpensive and have self-resonance ranges in comparatively high frequencies due to their low absorption factor. When used in conventional dynamically loaded bearings for machine units, such helical steel springs achieve several millions of load alternation cycles without functional failure with linear axial resilience paths of 20%. Insofar, they are to be considered as being ideal components for the automobile bearing construction. The reason why such helical steel springs are in fact hardly being used to date in the construction of unit bearings for the construction of cars, resides in two almost insuperable disadvantageous properties of these springs, namely in their only extremely low stability under radial load, and in their excellent, yet absolutely undesired good conductivity of structure-borne noise. With respect to their mechanical strength, helical steel springs can be described as having a perdurable stability with axial load, but when being subjected to only a minor radial load, they have, at best, a short-term stability.

It is known from prior art, such as for example from the two German laid-open documents DE 195 34 239 A1 and DE 23 07 567 A1, that numerous attempts have been made to prevent the two unfavorable properties of helical steel springs identified above from becoming effective, in which the helical steel spring disposed in the bearing as a suspension spring is mounted on rubber cushions in three dimensions and is buffered by a rubber coating pad extending axially to the helical spring. The bearing properties, however, could not be thus improved, since the rubber cushions under and on the helical springs wore out rapidly due to the high dynamic stress introductions, and the relief from transverse forces in the helical spring was not efficient enough.

Starting from said prior art, the invention is based on the technical object of realizing an elastomer spring for supporting an axially aligned helical spring which is also axially loadable as provided under static and dynamic pressure, with said helical spring achieving sufficient permanent stability, even when used in bearings exposed to major transverse forces in the radial direction with appropriate load.

The invention solves this problem in that said elastomer spring for supporting the helical spring is, matched by way of configuration and dimensioning to the parameters of use given in each case, configured and dimensioned laterally yielding, i.e. in the radial direction, relative to the axially aligned helical spring to be supported, and having, in the radial direction, a markedly low spring rigidity.

In contrast to prior art, the concept on which the invention is based does not reside in compensating the effects of impinging transverse forces by axially stabilizing the helical spring through the capture of the helical spring in a constructional-mechanical manner or through the over-dimensioning of same. It is rather that the helical spring is supported on an elastomer spring, which is matched as a particularly laterally yielding transverse load spring. The transverse forces arising between the bearing and the counter-bearing in such a spring arrangement are thereby entirely absorbed in the laterally yielding transverse load spring, the spring rigidity of which, in the radial direction, is smaller by a multiple than the spring rigidity of the helical spring in the radial direction. Thus, it is achieved that the transverse forces or shearing forces acting upon such a spring arrangement can virtually be entirely decoupled from the axial helical spring.

The elastomer spring used for supporting the helical spring has to be correspondingly so non-rigidly adjusted in the radial plane that it is able to absorb all transverse forces in a resilient and decoupling manner, which by far might even come close to the critical radial load capacity of the helical spring. However, it is to be designed as resistive to transverse loads as possible within observation of this limit, so as to prevent the supported helical spring from an uncontrolled floating.

The method of realizing such a matching of the radial spring rigidity of a laterally yielding transverse load spring is, in principle, possible for every person skilled in the art of rubber technology. Preferably, the spring rigidity of the elastomer spring serving as a transverse load spring is here reduced in that the axial height of the elastomer spring is increased, the hardness of the matrix elastomer of the transverse load spring is decreased, and, in particular when a higher elastomer hardness is chosen for the purpose of mechanical stability, recesses and cavities in the matrix are incorporated into such a type of material-wise harder elastomer matrix. In this way, the ratio of axial rigidity/radial rigidity of the series connection of the helical steel spring and the transverse load absorbing elastomer spring can be set to values ranging from 1:1 to 30:1. As a rule, an operation range of this ratio of axial rigidity/radial rigidity is thereby preferably to be set from 10:1 to 20:1.

According to a configuration of the invention, a profiled sheet metal is incorporated by vulcanization into the elastomer spring immediately below the load-receiving surface of the elastomer spring, plane-parallel to same and completely enclosed by the elastomer of the spring, the surface of said profiled sheet metal being complementary in shape to the supporting surface of the helical spring and being thereby dimensioned at least slightly larger than said force-introducing supporting surface of the helical spring. The elastomer layer between the surface of the profiled sheet metal and the supporting ring surface of the lowest winding of the helical coil is thereby in principle as small as possible, but has to be sufficiently large at the same time so as to withstand a permanent mechanical stress and also to acoustically isolate the helical spring with respect to the introduced structure-borne noise as early as in this place.

Such a kind of radially aligned disc, namely a profiled sheet metal incorporated by vulcanization, provides for a stable and wide surface, hence mostly tension-free introduction of the forces introduced into the elastomer spring by the helical spring. The profiled sheet metal hence serves for an improvement of the mechanical coupling of the supported helical spring to the laterally yielding elastomer spring.

According to a further configuration of the invention, the dynamic connection of the helical spring to the elastomer spring can be further improved in that on the load-receiving surface of the elastomer spring, a dome is formed projecting axially into the helical spring, which is homogenously formed as a rule, at the same time when the spring elastomer is injection-molded. The coupling can in particular still be further improved in that the profiled sheet metal of the load-receiving surface is also pulled into said dome and hence also into the base of the helical spring, in a cylindrical or a parallelepiped shape or principally with a ground surface configuration matching the helical spring. Also the profiled sheet metal thus spatially expanded, is in each case completely incorporated into the elastomer of the dome and the spring by way of vulcanization.

A quite essential stabilization and improvement of the entire device can moreover be achieved by a further configuration of the invention in that the bottom face opposite the load-receiving surface of the elastomer spring does not rest directly on a connection piece of the counter-bearing or is inserted in a receiver formed therein in a shape-complementary manner, but is rather connected all-over and in a material-fitting manner with a profiled sheet metal-type bottom plate. Said bottom plate, being interconnected mechanically fix all-over and in a material-fitting manner with the elastomer spring by adhesion, incorporation by vulcanization, can then be inserted or placed on top of a correspondingly configured counter-bearing connection piece of a bearing or an otherwise configured receptacle preferably in a form-fitting manner or at least form-fittingly fixed in the radial plane. Such a kind of a mostly form-fitting connection of the transverse load elastomer spring to the counter-bearing, for one, and to the base of the supported helical spring, for another, guarantees an optimally reproducible introduction of emerging transverse force components into the laterally yielding elastomer spring. It is moreover guaranteed by the thus ensured homogenous introduction of the emerging axial forces via the two profiled sheet metals into the transverse load spring that in the manner inherent in the material rubber, the transverse rigidity of the elastomer spring decreases with increasing axial load. This results additionally in a safety tolerance even in the limit range of the respective dimensioning and configuration of the spring system.

Due to the series connection of a helical spring steel spring and the laterally yielding elastomer spring, bearings can be produced exhibiting optimum characteristic rating data fields when these bearings are used as unit bearings in a motor vehicle.

Further configurations of the invention are the subject matter of the subclaims and are explained in detail in the following by means of realization examples in conjunction with the drawings.

It is shown in

Figure 2:
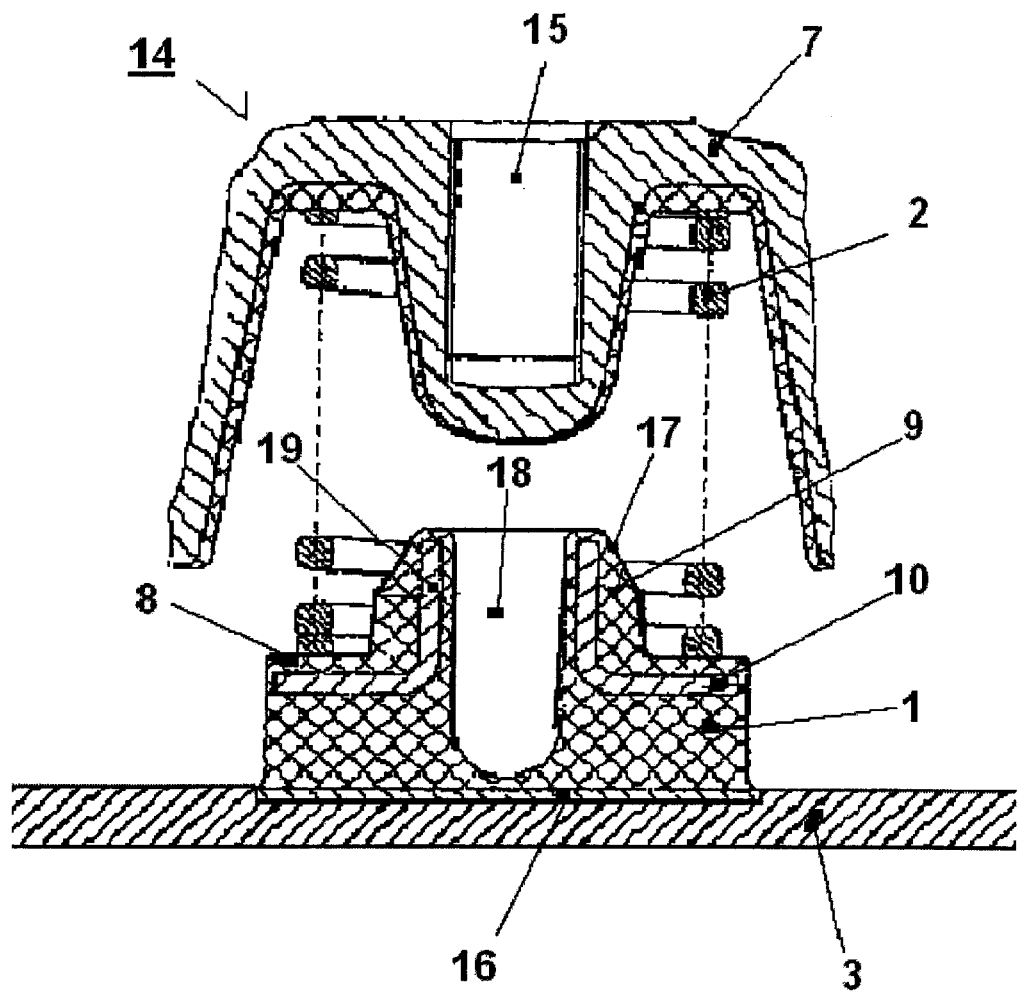

FIG. 1 a first example of a realization of the invention in an axial section and a schematic representation; and FIG. 2 a second example of a realization of the invention, likewise in an axial section and a schematic representation.

In FIG. 1, a first example of a realization of the invention is shown in an axial section and in a mostly schematized representation. On an elastomer spring 1, the base 4 of a helical spring 2 made of spring steel, is supported. The bottom face 5 of the elastomer spring 1 is supported on a counter-bearing 3. The load-receiving head 6 of the helical spring 2 carries a dynamically load-impingible bearing 7.

On the load-receiving surface 8 of the elastomer spring 1, a dome 9 is integrally formed from the matrix elastomer of elastomer spring 1. The outer contour of dome 9 is so adapted to the clear inner contour of helical spring 2 that dome 9 acts as a centering pin for helical spring 2 on the load-receiving surface 8 of elastomer spring 1.

Closely below the surface of elastomer spring 1 on the load-receiving side, and following the entire three-dimensional contour thereof in a plane-parallel manner, a profiled sheet metal 10 is so incorporated into elastomer spring 1 by vulcanization that the sheet metal is completely enclosed by the elastomer. So as to ensure a permanent and hard-wearing integration of the sheet metal, in spite of the surface-close position of the sheet metal 10 in the elastomer of elastomer spring 1, the plane, annulus-shaped outer area of sheet metal 10, is provided with recesses 11 through which the elastomer of elastomer spring 1 extends.

The matrix elastomer of elastomer spring 1 is set in the rubber mixture and, if necessary, by realizing additional recesses (cf. FIG. 2), to be so laterally yielding that upon occurrence of transverse force components 12 under load 13 in the series-connected spring system consisting of elastomer spring 1 and helical spring 2, all transverse forces are absorbed in the laterally yielding elastomer spring 1 acting as a transverse load spring, and hence, helical spring 2 is decoupled and therewith protected from the occurrence of service-life-shortening transverse force components. In FIG. 2, this transverse force decoupling is illustrated by the dashed lines 3' and 1'.

A further example of elastomer spring 1 is shown in the assembly of a schematically illustrated typical motor bearing for a motor vehicle.

FIG. 2 shows the inventive elastomer spring 1 built into a motor bearing 14 together with a helical spring 2, in a cut representation. Motor bearing 14 is only partially shown in FIG. 2 and can be recognized by a bearing connection piece 7, as well as a lower housing wall serving same as a counter-bearing 3.

In bearing connection piece 7, a central bore 15 including a thread is provided as a bearing connection for connecting a load, which central bore is open on the bearing side, and closed in a fluid-tight manner towards the hydraulic bearing on the counter-bearing side.

On its bottom face on the counter-bearing side, elastomer spring 1 comprises a bottom plate 16 and is connected with same in a material-fitting manner. Said bottom plate 16 being in turn connected form-fittingly, if the case may be, in addition material-fittingly with counter-bearing 3.

On the load-receiving surface 8 of elastomer spring 1, a dome 9 is integrally formed from the matrix elastomer of elastomer spring 1 as a centering pin for helical spring 2. The centering pin is tapered at its bearing side end and therefore comprises insertion shoulders 17 facilitating the insertion of dome 9 and elastomer spring 1 into helical spring 2 when the bearing is being assembled.

Dome 9 comprises on its bearing side an open recess 18 extending throughout the entire centering pin 9 until deep into elastomer spring 1.

Recess 18 serves for reducing the spring rigidity of elastomer spring 1 in the radial direction, since it reduces the push surface of elastomer spring 1 and hence the readjustment force of elastomer spring 1 in the radial direction.

The simultaneously arising and undesired weakening of centering pin 9 caused by recess 18, is compensated by sheet metal 10 configured appropriately counter-acting. Sheet metal 10 is comprised of a plane, annulus disc-shaped portion and a central cylindrical portion 19 through which extends recess 18 into elastomer spring 1.

What is claimed is:

1. Elastomer spring supporting, in series, an axially aligned helical spring comprised of spring steel and being axially loadable as provided under static and dynamic pressure, the elastomer spring being dimensioned and configured as a laterally yielding transverse load spring in which a spring rigidity of the elastomer spring in a radial direction is smaller than the spring rigidity of the helical spring in the radial direction.

2. Elastomer spring according to claim 1, wherein the spring rigidity of the elastomer spring is reduced by an increase of an axial height of the elastomer spring, a reduction of a hardness of the elastomer forming the elastomer spring, and recesses or cavities formed in the elastomer spring.

3. Elastomer spring according to claim 1, a ratio of axial rigidity/radial rigidity of the helical steel spring and the elastomer spring is in a range from 1:1 to 30:1.

4. Elastomer spring according to claim 1, wherein a radial face of the elastomer spring possess a surface-complementary configuration with respect to a supporting surface of the helical spring, and the radial face of the elastomer spring being over-dimensioned according to a size of one helical spring wire diameter.

5. Elastomer spring according to claim 1, including a profiled sheet metal incorporated into the elastomer spring by vulcanization directly below a load-receiving surface of the elastomer spring and plane-parallel to the load-receiving surface, the profiled sheet metal being completely enclosed by the elastomer spring, the profiled sheet metal being shape-complementary to a supporting surface of the helical spring and being dimensioned at least slightly larger than the supporting surface of the helical spring.

6. Elastomer spring according to claim 1, including a dome formed on a load-receiving surface of the elastomer spring as a centering pin for the helical spring.

7. Elastomer spring according to claim 6, including a sheet metal entirely incorporated in the elastomer spring by way of vulcanization, the sheet metal having a contour which follows a three-dimensional contour of the dome.

8. Elastomer spring according to claim 1, wherein the elastomer spring includes a cavity aligned coaxially to a longitudinal axis of the helical spring or a recess aligned coaxially to the longitudinal axis of the helical spring and open through a sheet metal towards the helical spring.

9. Elastomer spring according to claim 1, including a bottom plate material-fittingly connected with a bottom surface of the elastomer spring opposite a load-receiving surface of the elastomer spring, the bottom plate extending over the entire bottom surface of the elastomer spring.

10. Elastomer spring according to claim 1, wherein a radial deflectability of the elastomer spring between a load-receiving surface and a bottom surface of the elastomer spring is larger than a height of the elastomer spring.

11. Use of an elastomer spring according to claim 1 for supporting load-bearing helical axial springs in bearings or unit supports in motor vehicles.

12. Elastomer spring supporting, in series, an axially aligned helical spring made of spring steel which is axially loadable as provided under static and dynamic pressure, the elastomer spring being configured and dimensioned as a laterally yielding transverse load spring, the elastomer spring having a load-receiving surface, and a profiled sheet metal entirely incorporated into the elastomer spring by way of vulcanization directly below the load-receiving surface of the elastomer spring and plane-parallel to the load-receiving surface, the sheet metal being completely enclosed by the elastomer spring, a surface of the profiled sheet metal being complementary in shape to a supporting surface of the helical spring and being dimensioned at least slightly larger than the supporting surface of the helical spring, the sheet metal having a contour which follows a three-dimensional contour of a dome formed on the load-receiving surface of the elastomer spring.

13. Elastomer spring according to claim 12, wherein the dome formed on the load-receiving surface of the elastomer spring serves as a centering pin for the helical spring.

14. An arrangement comprising an elastomer spring positioned between a bearing connection piece and a counter-bearing in a motor bearing, the elastomer spring supporting, in series, an axially aligned helical spring made of spring steel which is axially loadable under static and dynamic pressure, the elastomer spring being laterally yielding and having a load-receiving surface supporting the helical spring, the elastomer spring having a spring rigidity in a radial direction that is smaller than the spring rigidity of the helical spring in the radial direction.

15. The arrangement according to claim 14, wherein the elastomer spring includes a dome extending into the helical spring to serve as a centering pin for the helical spring.

16. The arrangement according to claim 14, including a metal piece incorporated into the elastomer spring below the load-receiving surface of the elastomer spring.

17. The arrangement according to claim 16, wherein the metal piece includes a plurality of openings through which material forming the elastomer spring extends.

18. The arrangement according to claim 14, wherein the elastomer spring includes an axially extending recess opening in a direction towards the helical spring.

* * * * *